(12) United States Patent
Peeters

(10) Patent No.: US 6,546,990 B2
(45) Date of Patent: Apr. 15, 2003

(54) WINDING MECHANISM FOR A SUN SCREEN

(75) Inventor: Piet Peeters, Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/885,486

(22) Filed: Jun. 20, 2001

(65) Prior Publication Data

US 2002/0043581 A1 Apr. 18, 2002

(30) Foreign Application Priority Data

Jun. 21, 2000 (NL) .............................................. 1015493

(51) Int. Cl.[7] .................................................. B60J 3/00
(52) U.S. Cl. ................. 160/370.22; 160/352; 296/97.8; 242/397; 242/615.21
(58) Field of Search .......................... 160/370.22, 352, 160/262, 56, 23.1; 296/97.8, 98, 100.15; 242/397, 615.21, 615

(56) References Cited

U.S. PATENT DOCUMENTS

| | | | | |
|---|---|---|---|---|
| 2,592,090 A | * | 4/1952 | Weaver | |
| 3,075,805 A | * | 1/1963 | Golde et al. | |
| 4,245,675 A | * | 1/1981 | Chiba et al. | |
| 4,792,178 A | * | 12/1988 | Kokx | |
| 2002/0084380 A1 | * | 7/2002 | Porter | |

FOREIGN PATENT DOCUMENTS

| | | | |
|---|---|---|---|
| EP | 1006012 | * | 11/1999 |
| EP | 1 006 012 A2 | | 6/2000 |

* cited by examiner

*Primary Examiner*—Blair M. Johnson
(74) *Attorney, Agent, or Firm*—Westman, Champlin & Kelly, P.A.; Steven M. Koehler

(57) ABSTRACT

A winding mechanism for a screen which is stretched in the form of a tunnel during use includes a winding tube which is rotatable about an axis of rotation for winding and unwinding said screen. A guide for the screen is disposed beside the winding tube, which guide is curved in such a manner that the distance via the guide and via the surface of the winding tube surface to a line on the surface of the winding tube that extends parallel to the axis of rotation is the same for all points that are located at the same longitudinal position on the screen. In a further embodiment, a rectilinear auxiliary guide can be disposed between said guide and said winding tube, in such a manner that the screen will make contact therewith over its entire width.

14 Claims, 3 Drawing Sheets

WINDING MECHANISM FOR A SUN SCREEN

BACKGROUND OF THE INVENTION

The invention relates to a winding mechanism for a sun screen which is stretched in the form of a tunnel during use, which winding mechanism is intended for use in an open roof construction of a vehicle and which comprises a winding tube which is rotatable about an axis of rotation for winding and unwinding said sun screen.

When such a sun screen is used in a vehicle, and it is desired to utilize the interior space of the vehicle optimally, the sun screen should extend as closely to the roof liner of the vehicle in question as possible over its entire width. Since the inside contour of the roof liner of a vehicle is generally curved (in particular seen in a plane perpendicularly to the longitudinal axis, front to back, of the vehicle), also the sun screen will be curved in this manner, or, in other words, extend in the form of a tunnel. Such a curvature can be realised, for example, by using curved, stationary guides extending in the transverse direction of the vehicle.

One drawback of a sun screen which is thus stretched in the form of a tunnel is the fact that some parts of the sun screen (in particular the central part thereof) are stretched during winding and unwinding of the sun screen, while other parts (in particular the edge areas) are not stretched, so that they can flap uncontrollably.

SUMMARY OF THE INVENTION

It is an object of the present invention to provide a winding mechanism of the type to which the invention relates, by means of which the above-mentioned drawback can be eliminated in a simple yet effective manner.

In order to accomplish that objective, the winding mechanism includes a guide for the sun screen disposed beside the winding tube, which guide is curved in such a manner that the distance via the guide and via the surface of the winding tube surface to a line on the surface of the winding tube that extends parallel to the axis of rotation is the same for all points that are located at the same longitudinal position on the sun screen.

The phrase "points located at the same longitudinal position on the sun screen" is understood to mean those points on the sun screen which are located on the line of intersection between a vertical plane extending transversely to the vehicle and the sun screen. Said line will be curved to conform to the tunnel form of the sun screen. Starting from a random point on said line, the distance (seen in the longitudinal direction of the sun screen) via said guide and via said winding tube surface to a line (in principle any line) on the surface of the winding tube that extends parallel to the axis of rotation will be the same in all cases. In this manner, every part of the sun screen will be stretched in the same manner, so that flapping of the sun screen will not occur. Thus the curved guide provides compensation for differences in length from the sun screen, which is stretched in the form of a tunnel, to the winding tube for said sun screen.

When the sun screen extends directly from the thus curved guide to the winding tube surface, the sun screen will make contact with the winding tube at different circumferential positions along the length thereof. Put differently, different parts of the sun screen will be wound onto the winding tube over different lengths before reaching the aforesaid line that extends parallel to the axis of rotation. A direct consequence of this is that the various parts of the sun screen (seen in the transverse direction of the sun screen) make contact with the winding tube at different angles. This may affect the correct winding and unwinding of the sun screen, while the sun screen is moreover subjected to possibly harmful deformations.

In order to overcome this drawback, it is proposed in accordance with a preferred embodiment of the winding mechanism according to the invention to dispose a rectilinear auxiliary guide between said guide and said winding tube, in such a manner that the sun screen will make contact therewith over preferably the entire width of the sun screen.

Since the sun screen is in contact with the auxiliary guide over its width, it is ensured that said sun screen will make contact with the winding tube at the same angle, and consequently at the same location, seen in a circumferential direction, over its entire width. In other words, the sun screen will arrive at the winding tube in a flat condition.

Such a rectilinear auxiliary guide can be realised in various ways. Thus the auxiliary guide may be a rod having a small diameter in comparison with the winding tube. In principle, the same problem occurs when such a rod-shaped auxiliary guide is used as that which manifests itself at the location of a winding tube if an auxiliary guide is not used, but as a result of the small diameter, the effect that occurs at the location of the auxiliary guide only manifests itself to a very small extent. After all, also in the case of relatively large differences in the angle at which different parts of the sun screen reach the auxiliary guide, the circumferential distances between the various angular positions at which different parts of the sun screen reach the auxiliary guide will be very small.

According to another variant, the auxiliary guide is made up of a gap in a housing, which accommodates the winding tube. Generally, the winding tube of a winding mechanism to which the invention relates will be accommodated in such a housing. A gap formed in the housing can now advantageously perform the function of an auxiliary guide, so that one gap edge guides the sun screen.

The curved guide, but also the auxiliary guide, may be a rotating guide, which may consist, for example, of a large number of cylindrical rollers arranged in side-by-side relationship. The amount of friction with the sun screen, and consequently the wear thereon, can thus be reduced.

The invention will now be explained in more detail with reference to the drawing, which shows embodiments of the winding mechanism according to the invention.

DETAILED DESCRIPTION OF THE ILLUSTRATIVE EMBODIMENT

Figure 1:
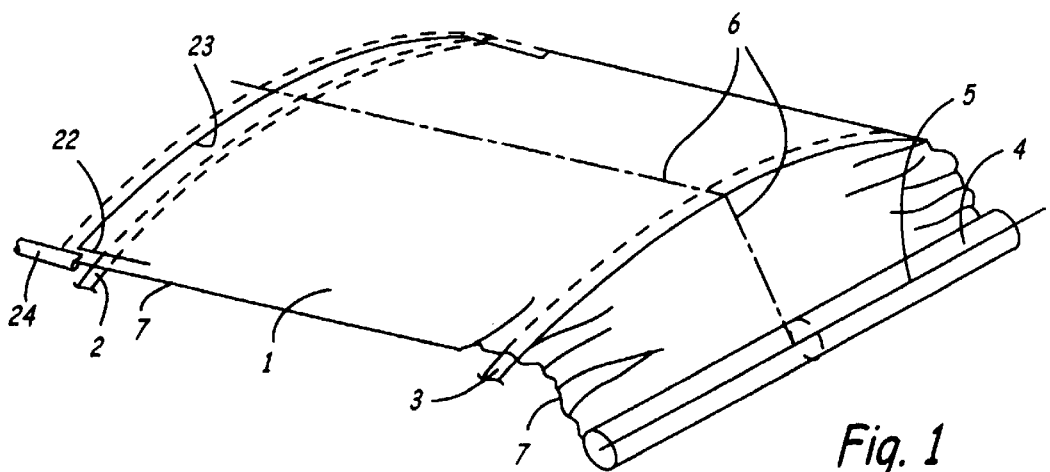
FIG. 1 is a schematic, perspective view of a winding mechanism according to the prior art.

In FIG. 1, a winding mechanism according to the prior art is shown in schematic and perspective view. The winding mechanism that is shown therein is intended for use in an open roof construction or assembly of a vehicle having a roof opening 22 whose roof liner (schematically illustrated at 23) exhibits a curved inside contour. In order to ensure that a sun screen 1 will optimally conform to the curved inside contour of the roof liner 23, only curved guides 2 and 3 (schematically indicated) can be used, which guides extend transversely to the longitudinal axis of the vehicle. As a result, the sun screen 1 will have a tunnel form in a stretched condition.

The winding mechanism comprises a winding tube 4, which is rotatable about an axis of rotation 5. When a central part of the sun screen 1 (indicated by line 6) is in the stretched condition, the edges 7 of the sun screen 1 proximate the winding tube 4 are not stretched, due to the transition from the tunnel form to the straight form of the winding tube 4. This is schematically indicated in FIG. 1, wherein edges 7 are shown to have a wavy form. Flapping of the edges 7 of the sun screen is thus possible, which is undesirable. As is well known in the art, the edges 7 can be guided in guides 24 along the longitudinal edges of the roof opening 22 (a portion of one of which is illustrated) disposed along the roof opening 22.

Figure 2:
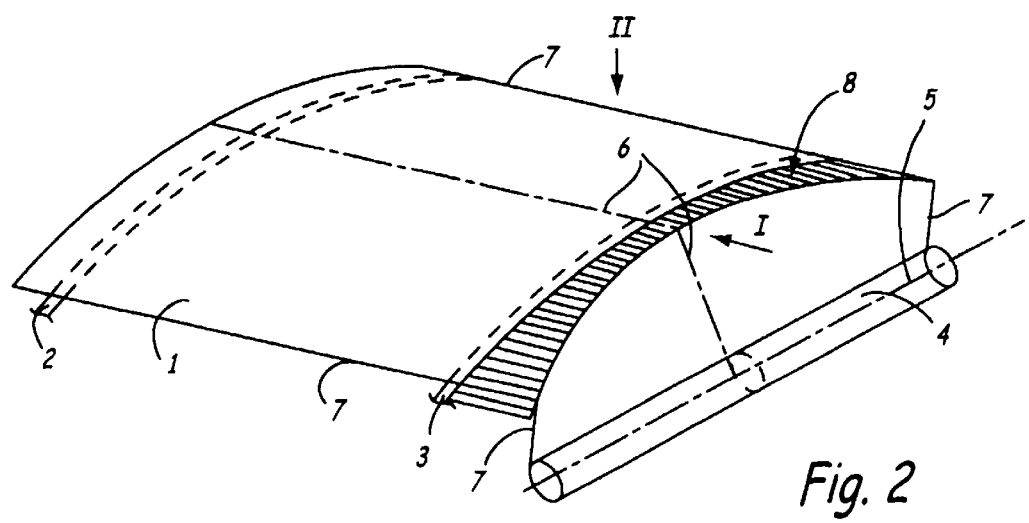
FIG. 2 is a similar view of an embodiment of the winding mechanism according to the invention.

FIG. 2 schematically shows, in a manner similar to FIG. 1, an embodiment of the winding mechanism according to the invention. Also this embodiment comprises guides 2 and 3, which give a sun screen 1 a tunnel-shaped contour that conforms to the inside contour of the roof liner of the vehicle. In this case a curved guide 8 is used, which is disposed between guide 3 and winding tube 4. In the illustrated embodiment, the curved guide 8 lies in the same curved plane as sun screen 1 and guides 2 and 3, seen in the longitudinal direction of the vehicle (arrow I). Seen in a direction perpendicularly to thereto (indicated by arrow II), the shape of the curved guide 8 is such that its width in the longitudinal direction increases from the centre towards the ends thereof. As a result of the use of a guide which is shaped in this manner, sun screen 1 is stretched over its entire surface area (both in its centre—schematically indicated by line 6—and at its edges 7 proximate the winding tube 4). In this manner, undesirable flapping of the sun screen 1 is prevented.

Figure 3:
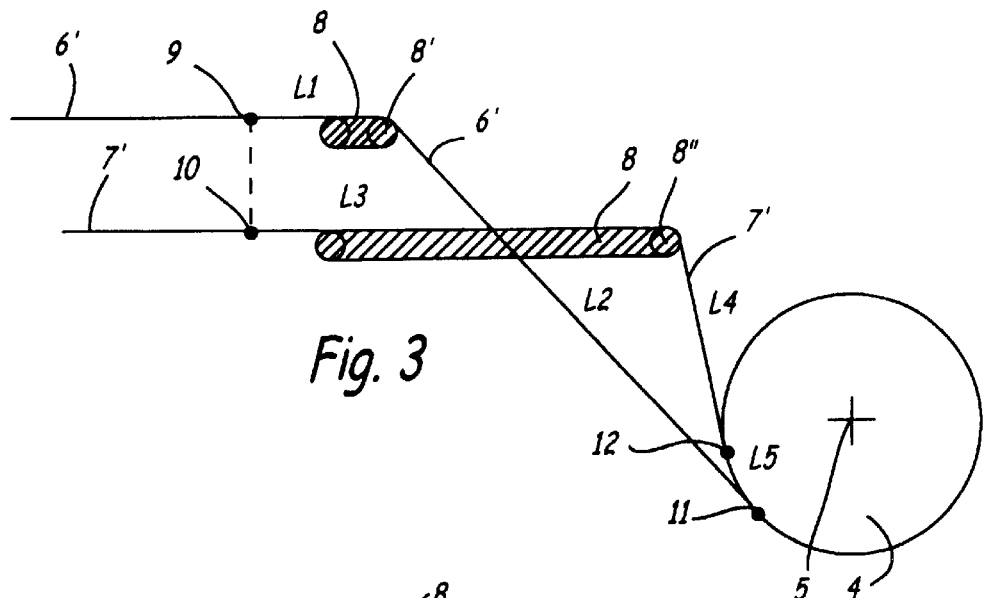
FIG. 3 is a schematic, longitudinal sectional view, which functions to illustrate the principle of the winding mechanism according to the invention.

The principle on which the operation of the curved guide 8 is based will now be explained in more detail with reference to FIG. 3. FIG. 3 is a longitudinal sectional view of the winding mechanism, showing the winding tube 4 and the axis of rotation 5 thereof. In FIG. 3, lines 6' and 7' represent a section of the sun screen 1 at the location of the central line 6 and section of the sun screen 1 at the location of an edge 7, respectively. The associated parts of the curved guide 8 are furthermore indicated at 8' and 8". It is noted within this framework that only part of the curved guide 8 comes into contact with sun screen 1. In actual practice the curved guide 8 may extend further, as seen in the sectional view of FIG. 3.

The shape of the curved guide 8 is as follows. Based on an identical position in the longitudinal direction (points 9 and 10), it obtains that the distance via guide 8 and via the surface of winding tube 4 to a line on the surface of winding tube 4 which extends parallel to axis of rotation 5 (for example line 11) is the same for both points. With regard to the longitudinal section at the location of the centre (6') of sun screen 1, this is the sum of the distances $l_1$ (the distance between point 9 and curved guide 8') and $l_2$ (the distance between curved guide 8' and line 11 on the surface of winding tube 4). With regard to the longitudinal section at the location of the edge (7') of sun screen 1, this corresponds to the sum of the distances $l_3$ (the distance between point 10 and curved guide 8"), $l_4$ (the distance between curved guide 8" and point of contact 12 with the surface of winding tube 4) and $l_5$ (the circumferential segment from point of contact 12 to line 11). Consequently it obtains that:

$$l_1+l_2=l_3+l_4+l_5$$

Such a relation obtains at any longitudinal section of the winding mechanism.

As is apparent from FIG. 3, the various parts of the sun screen 1 (in accordance with lines 6' and 7') make contact with the surface of winding tube 4 at different circumferential positions thereon. As a result, an angular difference also exists between the various parts of the sun screen 1. This may be disadvantageous with regard to the correct winding and unwinding of sun screen 1.

Figure 4:
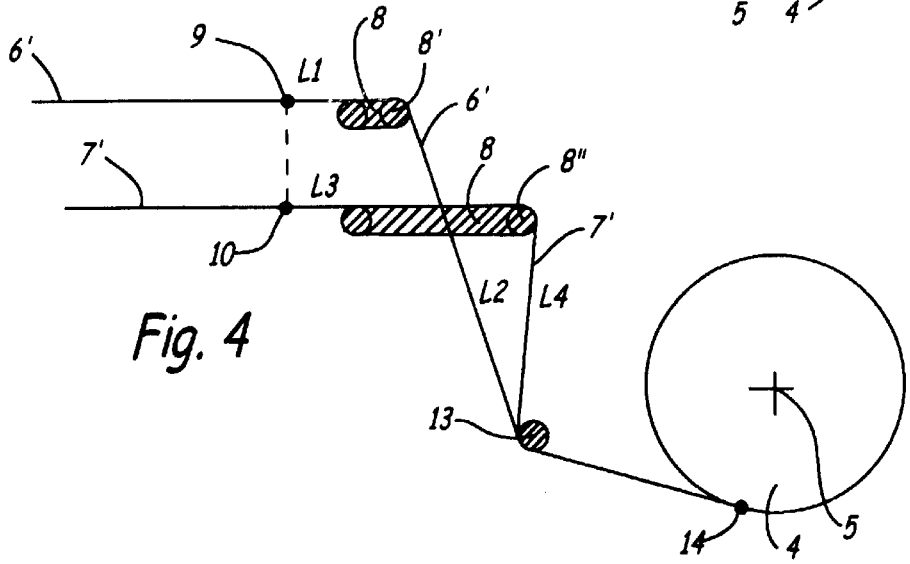
FIG. 4 is a similar longitudinal sectional view of an alternative embodiment.

Consequently, FIG. 4 shows a modified embodiment of the winding mechanism according to the invention, wherein a rectilinear auxiliary guide 13 is disposed between guide 8 and winding tube 8. Said auxiliary guide 13 is positioned in such a manner that sun screen 1 is in contact therewith along its entire length. Sections at the centre and at the edges of sun screen 1 are again indicated by lines 6' and 7', respectively. As a result of the use of auxiliary guide 3, the various parts of the sun screen 1 all make contact with the winding tube 4 at the same point 14. In this embodiment it obtains that $l_2$ (the distance between 8' and 13)+$l_1$ equals $l_4$ (the distance between 8" and 13)+$l_3$.

Figure 5:
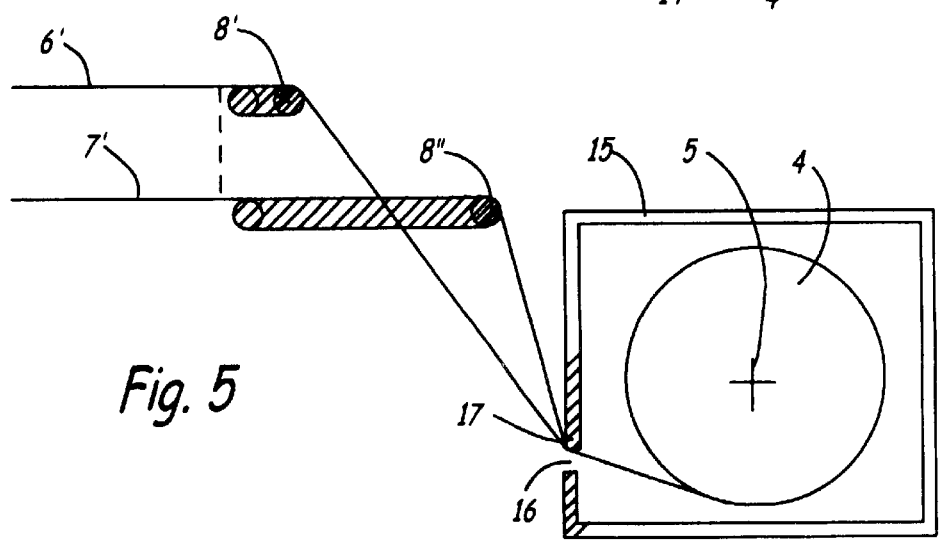
FIG. 5 shows, likewise in longitudinal sectional view, another embodiment of the winding mechanism according to the invention.

FIG. 5 shows an alternative embodiment of the winding mechanism, wherein winding tube 4 is mounted in a housing 15, which is provided with a gap 16. A boundary edge 17 of the gap 16 now performs the same function as rectilinear auxiliary guide 13.

Figure 6:
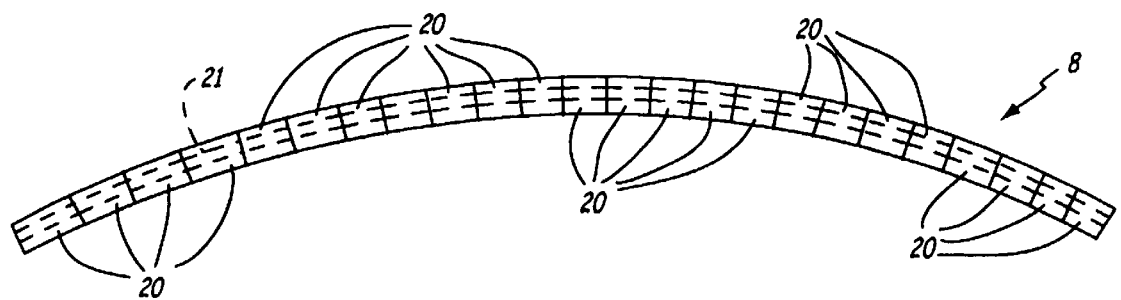
FIG. 6 is a schematic elevational view of a guide formed from a plurality of guide members.

The invention is not restricted to the embodiments as described above, which can be varied in several ways without departing from the scope of the invention as defined in the claims. By way of example it is noted that the curved guide 8 in FIG. 2 is configured in such a manner that it lies in the cylindrical plane that extends through guides 2 and 3. Also other configurations of the curved guide 8 are conceivable, wherein said guide extends outside said plane. Furthermore it is noted that a stationary guide 8 and auxiliary guide 13 (or 17) are used in the described embodiment. With a view to reducing the friction with a sun screen 1 that passes thereover, said guide 8 and/or said auxiliary guide 13, or the part thereof that comes into contact with the sun screen 1, can include a rotating guide or a plurality of guide members 20 as illustrated by way of example with curved guide 8 in FIG. 6. In this connection, cylindrical guide members 20 positioned adjacently to each other may be considered, which guide members or rollers 20 are arranged in a side-by-side relationship to jointly make up said guide 8 or said auxiliary guide 13, and which are rotatably mounted on a suitably curved shaft 21, or otherwise joined end to end for rotation.

Further the invention is applicable too to different screens which are not exclusively meant for application with an open roof construction for a vehicle. As non-limiting examples one can mention: bug screening, wall screens, film screen or any other type of technical or aesthetical screens.

What is claimed is:

1. A winding mechanism and a screen which is stretched in a form of a tunnel during use, the screen having lateral side edges, a leading edge and an attached edge, the winding mechanism comprising: a winding tube connected to the attached edge of the screen and which is rotatable about an axis of rotation for winding and unwinding said screen; a guide disposed beside the winding tube, which guide guides the screen in order to form the screen in the tunnel, and is curved in such a manner that, for all points that are located on a line perpendicular to and between the lateral edges of the screen, a distance from each of said points via the guide and via a surface of the winding tube to a line on the surface of the winding tube that extends parallel to the axis of rotation is the same for all of said points.

2. The winding mechanism according to claim 1, and further comprising a rectilinear auxiliary guide disposed between said guide and said winding tube, in such a manner that the screen will make contact therewith over its width.

3. The winding mechanism according to claim 2, wherein the rectilinear auxiliary guide is a rod having a small diameter in comparison with the winding tube.

4. The winding mechanism according to claim 2, wherein the rectilinear auxiliary guide is made up of a gap in a housing which accommodates the winding tube.

5. The winding mechanism according to claim 1, wherein at least one of the curved guide and the auxiliary guide is a rotating guides.

6. The winding mechanism according to claim 5, wherein said rotating guide includes a plurality of number of guide members arranged in side-by-side relationship.

7. The winding mechanism according to claim 6, wherein each guide member is a cylindrical roller.

8. A winding mechanism and a screen which is stretched in a form of a tunnel during use, the winding mechanism comprising:

a winding tube connected to the screen and which is rotatable about an axis of rotation for winding and unwinding said screen; a guide disposed beside the winding tube, which guide guides the screen in order to form the screen in the tunnel, and is curved in such a manner that, for all points that are located on a first line parallel to the axis of rotation and on the screen, a distance from each of said points via the guide and via a surface of the winding tube to a second line on the surface of the winding tube that extends parallel to the axis of rotation is the same for all of said points.

9. The winding mechanism according to claim 8, and further comprising a rectilinear auxiliary guide disposed between said guide and said winding tube, in such a manner that the screen will make contact therewith over its width.

10. The winding mechanism according to claim 9, wherein the rectilinear auxiliary guide is a rod having a small diameter in comparison with the winding tube.

11. The winding mechanism according to claim 9, wherein the rectilinear auxiliary guide is made up of a gap in a housing which accommodates the winding tube.

12. The winding mechanism according to claim 8, wherein at least one of the curved guide and the auxiliary guide is a rotating guide.

13. The winding mechanism according to claim 12, wherein said rotating guide includes a plurality of number of guide members arranged in side-by-side relationship.

14. The winding mechanism according to claim 13, wherein each guide member is a cylindrical roller.

* * * * *